US007006583B2

(12) United States Patent
Ho et al.

(10) Patent No.: US 7,006,583 B2
(45) Date of Patent: Feb. 28, 2006

(54) METHOD AND APPARATUS FOR RECEIVING DIFFERENTIAL ULTRA WIDEBAND SIGNALS

(75) Inventors: Minnie Ho, Palo Alto, CA (US); Jeffrey R. Foerster, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 232 days.

(21) Appl. No.: 10/231,706

(22) Filed: Aug. 30, 2002

(65) Prior Publication Data

US 2004/0042561 A1    Mar. 4, 2004

(51) Int. Cl.
H04L 27/06    (2006.01)
(52) U.S. Cl. .................. 375/316; 375/136; 375/141; 375/147; 375/351; 455/3.02; 455/334
(58) Field of Classification Search ............... 375/316, 375/267, 346, 150, 149, 141, 232, 344, 343, 375/133, 340, 351, 136, 147; 455/41.2, 273, 455/76, 41.1, 40, 234.1, 113, 252.1, 334, 455/3.02; 348/14.02; 342/21
See application file for complete search history.

(56) References Cited

U.S. PATENT DOCUMENTS

| | | | | |
|---|---|---|---|---|
| 4,964,138 A | * | 10/1990 | Nease et al. ................ 375/141 |
| 5,361,070 A | * | 11/1994 | McEwan ..................... 342/21 |
| 5,381,151 A | * | 1/1995 | Boles et al. ................. 342/21 |
| 5,621,913 A | * | 4/1997 | Tuttle et al. ............... 455/41.2 |
| 5,729,570 A | * | 3/1998 | Magill ........................ 375/149 |
| 5,781,621 A | * | 7/1998 | Lim et al. ............... 379/142.04 |
| 5,970,105 A | * | 10/1999 | Dacus ........................ 375/344 |
| 6,070,062 A | * | 5/2000 | Yoshida et al. ........... 455/234.1 |
| 6,185,284 B1 | * | 2/2001 | Goodman ................. 379/93.01 |
| 6,275,544 B1 |   | 8/2001 | Aiello et al. ................. 375/326 |
| 6,473,466 B1 | * | 10/2002 | Miyashita et al. .......... 375/267 |
| 6,505,032 B1 | * | 1/2003 | McCorkle et al. ......... 455/41.2 |
| 2001/0053175 A1 |   | 12/2001 | Hoctor et al. |
| 2003/0108133 A1 | * | 6/2003 | Richards ..................... 375/351 |

OTHER PUBLICATIONS

Federal Communication Commmission, Document # FCC 00-163, Released May 11, 2000.*
History of ultra wide Band (UWB) Radar & Communications: Pioneers and Innovators, Terence W. Barrett, Progress In Electromagnetics Symposium 2000, (PIERS2000), Cambridge, MA, Jul., 2000.*
"PulsON: Time Modulated Ultra-Wideband for Wireless Application", Time-Domain Corporation, May 2000, Rev 2; pp. 3-13.
"On Binary DPSK Detection", J.H. Park Jr., IEEE Transactions on Communications, vol. COM-26, No. 4; Apr. 1978; p. 484-6.
M.Z. Win et al., *Ultra-Wide Bandwidth Time-Hopping Spread-Spectrum Impulse Radio for Wireless Multiple-Access Communications*; IEEE Transactions on Communications, IEEE Inc., New York, US, vol. 48, No. 4, Apr. 2000, pp. 679-691.

* cited by examiner

*Primary Examiner*—Stephen Chin
*Assistant Examiner*—Ted M. Wang
(74) *Attorney, Agent, or Firm*—Trop, Pruner & Hu, P.C.

(57) ABSTRACT

A receiver may receive ultra-wideband, spread-spectrum differential signals. In some embodiments, the receiver may use a variable bandwidth low pass filter. Lowering or raising the bandwidth of the low pass filter may improve performance in particular wideband signal situations.

14 Claims, 5 Drawing Sheets

METHOD AND APPARATUS FOR RECEIVING DIFFERENTIAL ULTRA WIDEBAND SIGNALS

FIELD OF THE INVENTION

This disclosure relates generally to devices and methods for recovering radio frequency signals that may include ultra wideband signals.

BACKGROUND

With the advent of wireless network systems such as, for example, wireless local area networks, personal area networks and the like, applications that benefit from such wireless technology continue to expand. Typically, in these systems, a digital data stream is modulated and transmitted over a communications channel to one or more receivers. The transmitters and receivers may be in close proximity or spaced apart. The transmitters and receivers that transmit this digital data collectively may comprise a wireless network system.

As applications, and therefore demand, for wireless-networking systems have increased, so has the need to provide for these network systems within the frequency allocations available for their use. As the frequencies available are limited, there is increasing demand for systems that can communicate within the available bandwidth space and yet not interfere overly with other networking systems or be overly sensitive to such interference.

What is needed therefore is a networking communications systems that may have the ability to transmit and receive digital signals within the frequency allocations provided and provide numerous other benefits.

DETAILED DESCRIPTION

Figure 1:
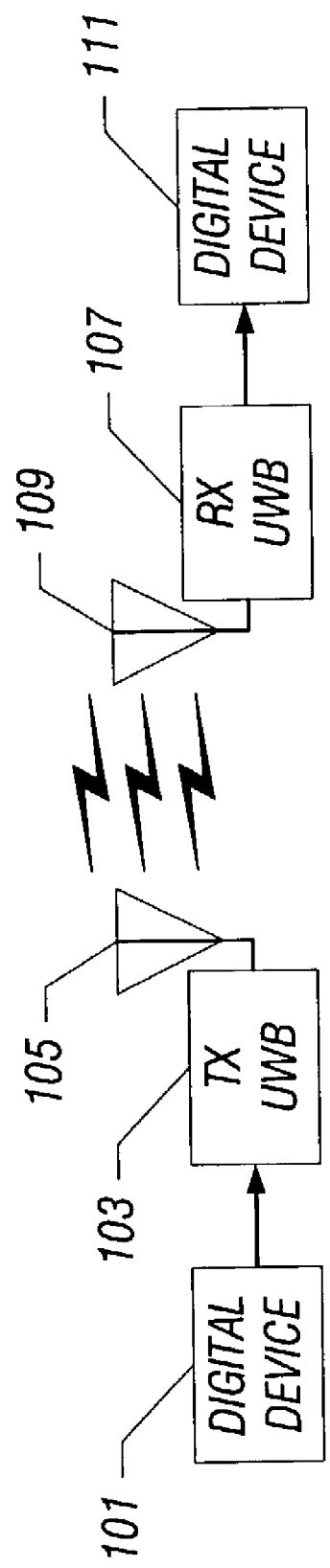
FIG. 1 illustrates a block diagram of an ultra wideband communications system according to embodiments of the present invention.

Referring now to FIG. 1, an ultra wideband communications system is depicted wherein a first digital device 101 transmits data to an ultra wideband transmitter 103 that in turn converts the digital data into radio frequency signals that is transmitted through an antenna 105. An ultra wideband signal may, in some embodiments, be a signal that has a bandwidth divided by center frequency greater than approximately 0.25. The frequency spectrum of a transmitted signal may be spread, in some embodiments, by encoding bits with a spectrum-spreading codeword which may be in accordance with regulatory or other standards. In other embodiments, the frequency bandwidth of a transmitted signal is controlled by the width of the transmitted pulse; i.e., the shorter the pulse duration, the wider the bandwidth.

An ultra wideband receiver 107 may be coupled to an antenna 109 which may receive radio frequency data transmitted by the ultra wideband transmitter 103. The ultra wideband receiver 107 may receive the radio frequency information and converts it into digital data, which may be coupled to a second digital device 111.

Digital devices 101 and 111 may be any type of digital device that is usefully coupled to an ultra wideband communications system. For example, the digital devices 101 and 111 may be desktop computers, printers, network monitors or other digital devices.

Antennas 105 and 109 may be any type of antenna that is useful for transmitting and receiving ultra wideband signals. In operation, antenna 105 may convert voltage signals from ultra wideband transmitter 103 into radio frequency pulses, while antenna 109 may receive radio frequency pulses and convert them into a corresponding voltage signals. In some embodiments, the radio frequency pulses may be both positive and negative ("differential") pulses. Antennas 105 and 109 may be constructed as ground plane antennas, dipole antennas, slot antennas or other type of antenna that may be usefully employed. Additionally, while antenna 105 is shown as a transmitter antenna, in some embodiments, antennas 105 and 109 may be useful for both receiving and transmitting.

Figure 2:
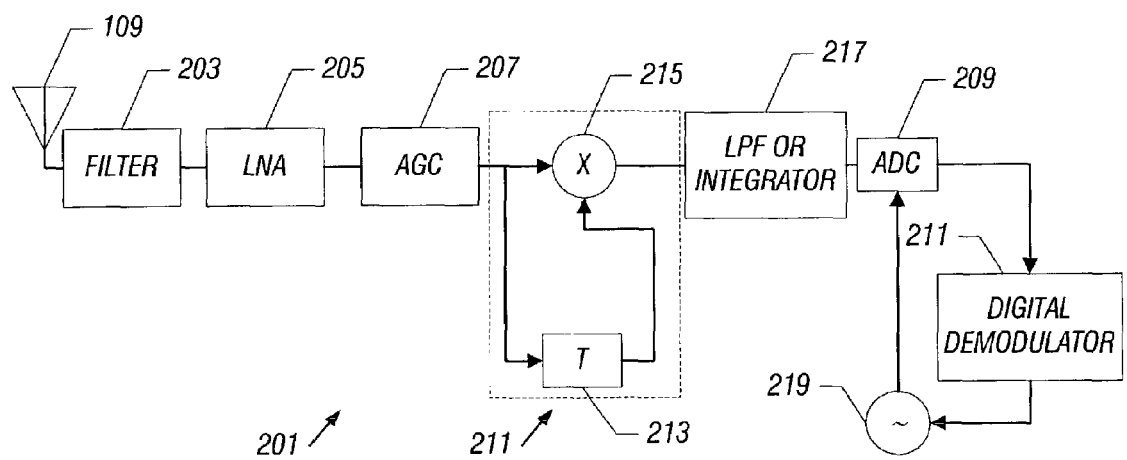
FIG. 2 illustrates a block diagram of an ultra wideband receiver according to embodiments of the present invention.

Referring now to FIG. 2, a block diagram of a receiving device such as may be incorporated into an ultra wideband receiver such as ultra wideband receiver 107 is illustrated. Antenna 109 may be coupled to a filter 203. Filter 203, in some embodiments, may be a band pass filter to reject out of band signals that may interfere with the desired ultra wideband signal. In other embodiments, filter 203 may be a matched filter, which may be utilized to match the incoming waveform or a notch filter to reject inband interferers.

A low noise amplifier (LNA) 205 may be coupled to the filter 203 and to an automatic gain control circuit (AGC) 207. The low noise amplifier 205 may amplify the received ultra wideband signal from the filter. Collectively, the filter 203 and LNA 205 may be considered a radio frequency ("RF") front end. The automatic gain control circuit 207 may serve to amplify or reduce an ultra wideband signal coupled from the low noise amplifier 205 to achieve a desired signal level. The AGC 207 may be utilized to compensate for dynamic fluctuations in the average amplitude of the received ultra wideband signal. In some embodiments, the AGC circuit 207 may provide an output signal that may be optimized for the dynamic range of an analog to digital converter (ADC) 209.

A differential correlator 211 may be coupled to the output of the AGC circuit 207 and to the input of a low pass filter or integrator 217. The differential correlator 211 may include a wideband delay element 213 and a mixer element 215. The delay element 213 may serve to delay an incoming RF waveform from an ultra wideband signal in an amount, in some embodiments, approximately equal to the symbol period. This delayed waveform may be then mixed by mixer 215 with a current received waveform to provide a mixed signal, which is coupled to low pass filter 217.

Low pass filter 217 may provide a filtering-integration function on the incoming signal from correlator 211. This filter may be either a fixed bandwidth filter or, in some embodiments, a variable bandwidth filter. The output of the low pass filter 217 may be coupled to the analog to digital converter 209. The analog to digital converter 209 may be coupled to a digital demodulator 221 and a sampling clock 219. The ADC 209, digital demodulator 221, and sampling clock 219 may be utilized to convert the received ultra wideband signal into digital data.

In some embodiments, receiver 201 may serve as a differential pulse shift-keying receiver that demodulates sequences of short pulses, each of which represents a single bit. In this case, it should be noted that the ultra-wideband signals are essentially pulses that may be transmitted and detected by transmitters and receivers such as transmitter 103 and receiver 107 respectively.

Figure 3:
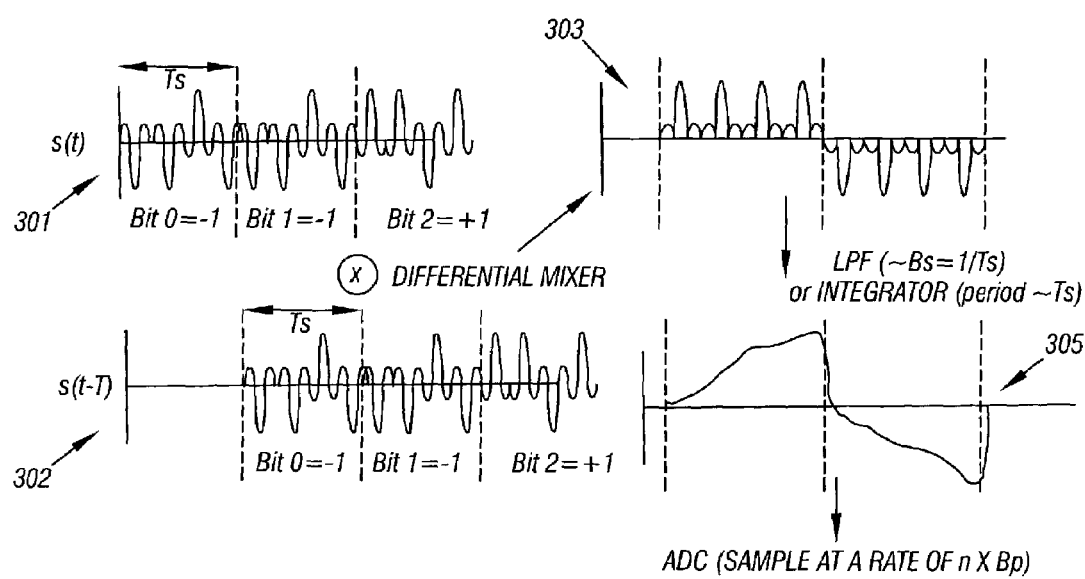
FIG. 3 illustrates wave forms associated with an ultra wideband receiver in accordance with embodiments of the present invention.

Alternatively, receiver 201 may serve as a differential pulse shift-keying receiver that demodulates spread spectrum signals where the spreading sequence is illustrated in FIG. 3. As an example, the spreading of the waveform may be accomplished using four chips per symbol.

Referring now to FIG. 3, the operation of the differential correlator 211 and low pass filter/integrator 217 is detailed according to embodiments of the present invention. In this illustration, (Ts) represents the symbol period, (St) is the received ultra wideband signal that may be at the input of differential correlator 211, S(t-T) is the signal present at the mixer 215 from the output of the wideband delay element 213. When utilized in a spread spectrum differential signal application, the differential correlator 211, in some embodiments, may function by mixing signal s(t) 301 with the delayed signal s(t-T) 302 to generate a mix signal 303. The mix signal 303 may be processed by a low pass filter/integrator 213 to produce an integrated waveform 305. As can be seen in waveform 305 in comparison with waveform 303, the peaks in waveform 303 have been averaged out in waveform 305. The receiver section 201 may accomplish a despreading of the spread spectrum ultra wideband signal and may allow the analog to digital converter 209 to sample at the input bandwidth of the symbol rate Ts. In this example four (4) pulses per time slot may be utilized. However, in an ultra wide band differential signal application, in some embodiments, a single pulse may be utilized per time slot.

As was previously discussed, low pass filter/integrator 217 may be either a fixed bandwidth filter, or in some embodiments, a variable bandwidth filter. In some embodiments, the band pass characteristics of the low pass filter/integrator 217 may be adjusted dynamically to achieve the best signal-to-noise ratio of the received ultra wideband signal. Since the pulse repetition frequency (Bp) may be, in some embodiments, much less than that of the actual signal bandwidth (W), the low pass filter/integrator bandwidth (Bf) or integration time (Tp) may vary between Bp<Bf (or 1/Tp)<W. This offers an opportunity to vary the complexity and performance of the ultra wideband receiver.

An optimum bandwidth of the low pass filter/integrator may not necessarily, in some embodiments, be equal to W. Ultra wideband signals may be viewed as waveforms that occupy a much greater bandwidth than the symbol rate. A low pass filter/integrator with high bandwidth may perform better than a low pass filter/integrator with low bandwidth depending on the environment in which the ultra wideband signal is transmitted. For example, in an environment with few signal reflections, a high bandwidth low pass filter/integrator may out perform a low bandwidth low pass filter/integrator. This may be because the low bandwidth low pass filter/integrator may remove much of the wide-band signal energy at the output of the differential correlator 211.

However, in an ultra wideband environment with significant multi path reflections, a low bandwidth low pass filter/integrator may out perform a higher bandwidth low pass filter. This may be because the low bandwidth low pass filter/integrator may capture and sum a portion of the energy from the additional paths of the multi path reflections while a high bandwidth low pass filter may only capture the energy from one of the paths. Thus, changing the bandwidth of a low pass filter/integrator either higher or lower may improve performance in particular ultra wideband signal situations.

Figure 4:
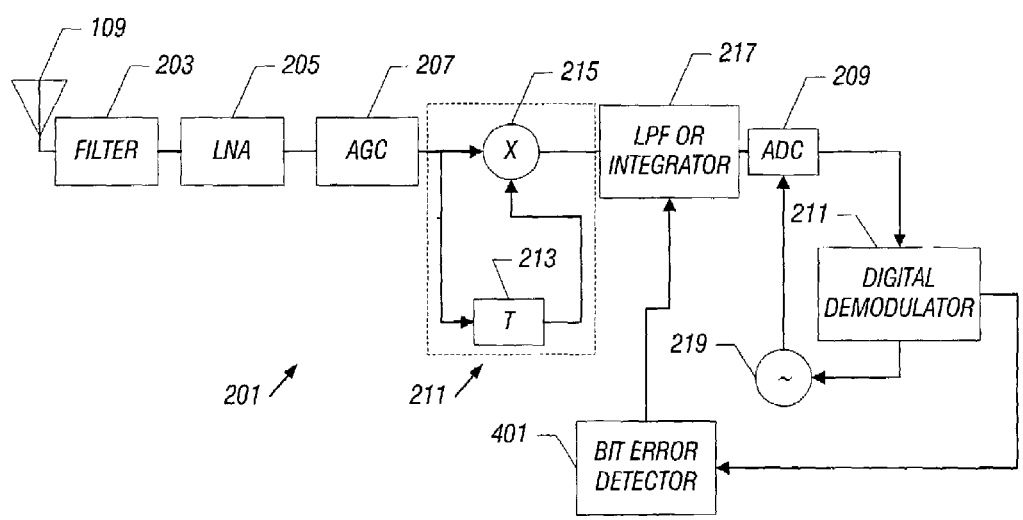
FIG. 4 illustrates an ultra wideband receiver section having a variable low pass filter/integrator according to embodiments of the present invention.

Referring now to FIG. 4, a receiver section as in 201 is illustrated with the addition of a bit error detector 401. The bit error detector 401 may be coupled to the digital demodulator 221 and to the low pass filter/integrator 217. In some embodiments, bit error detector 401 may adjust the bandwidth of the low pass filter/integrator 217 in response to bit error rates detected. Based in part on the bit error rate, the bit error detector 401 may either increase or decrease the bandwidth of the low pass filter/integrator 217 to reduce the detected error rate. The low pass filter/integrator 217 may have discrete bandwidth settings, which may be selected, in some embodiments, by bit error detector 401. In other embodiments, low pass filter/integrator 217 may be generally variable between an upper and lower bandwidth limit and the bit error detector 401 controls the bandwidth of the low pass filter/integrator within those parameters. In other embodiments, the bit error detector 401 may be replaced by a digital or analog symbol error detector.

Acquisition and synchronization of ultra wideband signals may be challenging due to the short impulse nature of the waveform. With a low pass filter bandwidth that is less than half the sample rate (Rs) of the ADC (i.e., Bf<Rs/2), the digital demodulator may perform direct digital matched filtering in order to detect packets with a single preamble sequence. For example, a 100 MHz PRF (Bp) may be detected with a 200 MHz ADC and associated digital demodulator and allow for a packet-by-packet demodulation. A relatively low sample rate may provide a reduction in a power consumed by the receiver 107.

In one embodiment, a relatively low sample rate may result in reduced power consumed by receiver 107. When receiving an ultra wideband signal with a fixed bandwidth low pass filter/integrator, the bandwidth, in some embodiments, may be between around Bp to considerably higher Bp. However, a variable-bandwidth low pass filter/integrator may allow for improved receiver performance in different signal environments as previously discussed. Additionally, in some embodiments, the wideband delay element 213 may be adjusted to change the delay length based on the received data rate. In this manner, in some embodiments, an increase or decrease in the data rate may be accommodated again leading, in some embodiments, to improved performance. For example, in environments with little or no multipath signal reflections, a higher data rate may be supported by the receiver 107.

Figure 5:
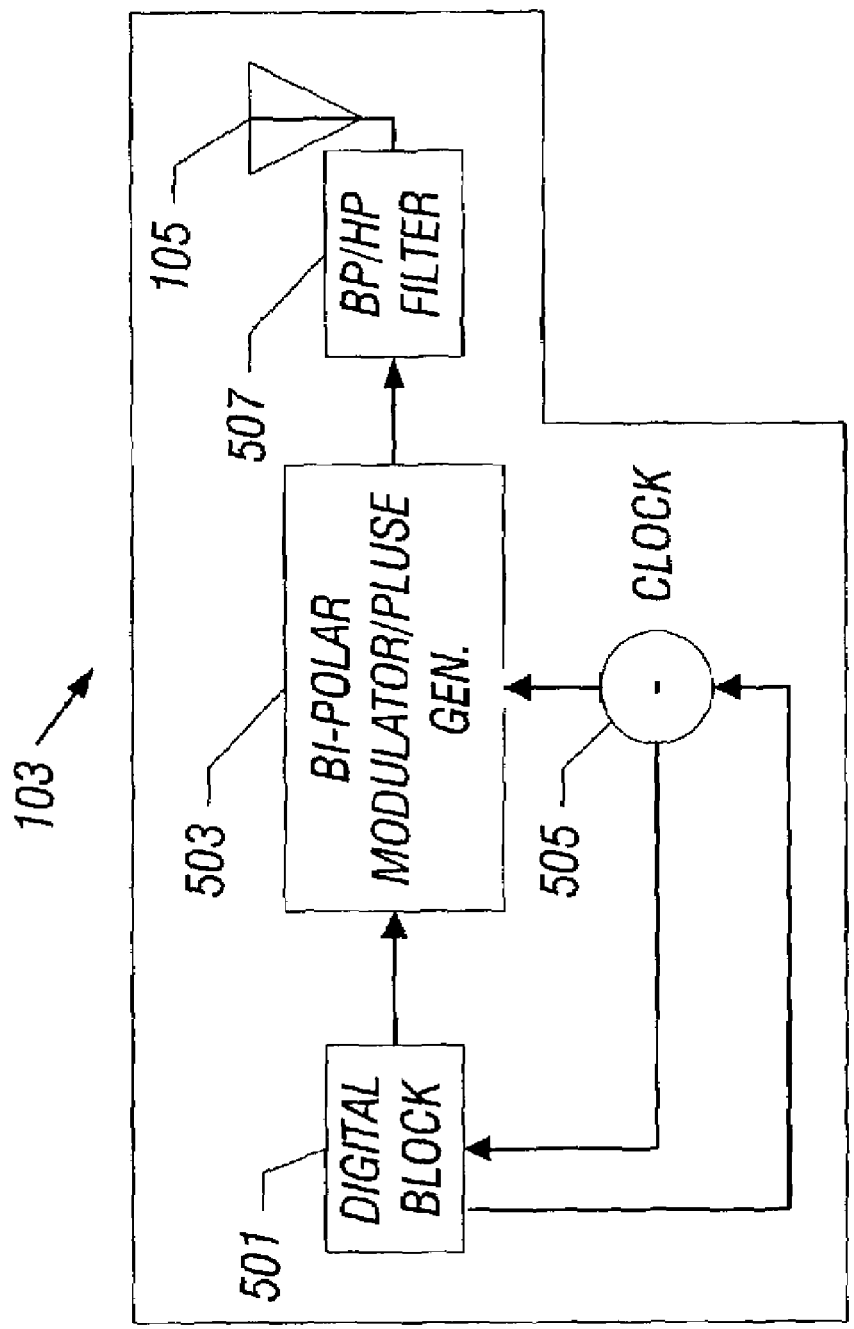
FIG. 5 illustrates an ultra wideband differential transmitter according to embodiments of the present invention.

Referring now to FIG. 5, an ultra wideband differential pulse transmitter 103 may include a digital block 501 that may include a preamble generator, a clocking control and a differential encoder. The digital block may be coupled to a bi-polar modulator and pulse generator 503 and to a clock circuit 505. The modulator 503 may be coupled to a band pass or high pass filter 507 that may be coupled to the antenna 105. As was described in association with FIG. 1, the transmitter 103 may encode digital data into ultra wideband differential pulses.

While the present invention has been described with respect to a limited number of embodiments, those skilled in the art will appreciate numerous modifications and variations therefrom. It is intended that the appended claims cover all such modifications and variations as fall within the true spirit and scope of this present invention.

The invention claimed is:

1. A Ultra wideband (UWB) receiver comprising:
   a first filter and amplifier to filter and amplify a differential radio frequency signal having a bandwidth divided by a signal center frequency greater than 0.25;
   a differential correlator coupled between said first filter and amplifier, and a low pass filter;
   a said low pass filter having a variable bandwidth; and
   a digital demodulator coupled to said low pass filter to recover digital data received from differential pulse signals; and
   wherein an error detector is coupled to the digital demodulator to change a bandwidth characteristic of the filter, said digital error detector is used to increase a bandwidth characteristic of the filter.

2. The UWB receiver as in claim 1, said delay element to delay the first received pulse by approximately one symbol period.

3. The UWB receiver as in claim 1 wherein the digital demodulator includes an analog to digital converter coupled to the filter to sample an output from the filter at the symbol rate of the received pulses.

4. The UWB receiver as in claim 7, the digital data error detector to decrease a bandwidth characteristic of the filter.

5. The UWB receiver as in claim 1 wherein the differential correlator includes a delay element and a mixer to delay a first received pulse and mix the delayed pulse with a second received pulse.

6. A method of receiving a Ultra wideband (UWB) radio frequency signal comprising:
   filtering and amplifying a differential radio frequency (RF) signal having a bandwidth divided by a signal center frequency greater 0.25 by a first filter and amplifier;
   correlating said filtered and amplified differential radio frequency signal using a differential correlator, wherein said correlator coupled between said first filter and amplifier, and a low pass filter;
   filtering said correlated differential radio frequency signal using a said low pass filter having a variable bandwidth; and
   demodulating said filtered correlated differential radio frequency signal using a digital demodulator to recover digital data from received differential pulses; and
   wherein filtering the correlated differential radio signal includes utilizing an error detector to change a bandwidth characteristic of the filter.

7. The method of claim 6 wherein correlating said differential radio frequency signal includes delaying a first received pulse and mixing the delayed pulse with a second received pulse.

8. The method of claim 7 wherein delaying the first received pulse includes delaying the first pulse by approximately one symbol period.

9. The method of claim 7 wherein demodulating said low pass filtered correlated differential radio frequency includes utilizing an analog to digital converter coupled to the filter to sample, at approximately the symbol rate of the received pulses, said filtered correlated differential pulses.

10. A Ultra wideband (UWB) receiver comprising:
    a first filter and amplifier to filter and amplify a differential radio frequency signal having a bandwidth divided by a signal center frequency greater than 0.25;
    a differential correlator coupled between said first filter and amplifier, and a variable bandwidth filter:
    a digital demodulator coupled to said variable bandwidth filter to recover digital data from received differential pulse signals; and
    wherein an error detector is coupled to the digital demodulator to change a bandwidth characteristic of the filter, said digital error detector is used to increase a bandwidth characteristic of the filter; and
    a dipole antenna coupled to said first filter.

11. The UWB system of claim 10 wherein the delay element to delay the first received pulse by approximately one symbol period.

12. The UWB system as in claim 10 wherein the digital demodulator includes an analog to digital converter coupled to the filter to sample an output from the filter at the symbol rate of the received pulses.

13. The UWB system of claim 10 wherein the differential correlator includes a delay element and a mixer to delay a first received pulse and mix the delayed pulse with a second received pulse.

14. The UWB system as in claim 10 wherein the filter is a variable bandwidth filter.

* * * * *